United States Patent Office 3,312,622
Patented Apr. 4, 1967

3,312,622
SILICONE-SILICATE POLYMERS AS CORROSION INHIBITORS
Arthur N. Pines, Snyder, and Eugene A. Zientek, Tonawanda, N.Y., assignors to Union Carbide Corporation, a corporation of New York
No Drawing. Original application Dec. 12, 1960, Ser. No. 75,097, now Patent No. 3,198,820, dated Aug. 3, 1965. Divided and this application Aug. 19, 1964, Ser. No. 390,727
71 Claims. (Cl. 252—75)

This application is a divisional of application Ser. No. 75,097, filed Dec. 12, 1960, and subsequently granted as United States Patent 3,198,820.

This invention relates to the use of novel organosilicon polymers in inhibiting the corrosion of metals that are in contact with aqueous solutions. More particularly, this invention relates to the use of novel organosilicon polymers as corrosion inhibitors in alcohol compositions that are adapted for use (as such or when diluted) as coolants in the cooling systems of internal combustion engines.

Anti-freeze compositions containing alcohols, especially ethylene glycol, are commonly mixed with the cooling water in the cooling systems of internal combustion engines in order to depress the freezing point of the water. The alcohols gradually decompose in the cooling systems to produce acidic products which lower the pH of the coolant. It has been found that in the cooling systems of internal combustion engines metallic surfaces in contact with such coolants become seriously corroded and the the corrosion becomes progressively worse as the pH of the coolant decreases. The decomposition of the alcohol, the lowering of the pH of the coolant, and the attendant corrosion of the metallic surfaces of the cooling system result in both a significant loss of alcohol through decomposition at low pH values and leakage in the cooling system.

Hence, considerable effort has been directed toward obtaining anti-freeze compositions that contain materials (corrosion inhibitors) which retard the corrosion of the cooling systems of internal combustion engines. It was also recognized that it would be most desirable if such inhibited anti-freeze compositions were single phase systems, since anti-freeze compositions containing two or more phases entail handling and dispensing problems in order to insure that the compositions as they reach the consumer contain the proper proportion of each phase.

Numerous anti-freeze compositions containing alcohols and inhibitors have been proposed to date. Such inhibitors include both organic materials and inorganic materials. Illustrative of the organic materials that have been used as inhibitors in anti-freeze compositions are: guanidine, citrates, coal tar derivatives, petroleum bases, thiocyanates, peptones, phenols, thioureas, tanin, quinoline, morpholine, triethanolamine, tartrates, glycol monoricinoleate, organic nitrites, mercaptans, organic oils, sulfonated hydrocarbons, fatty oils and soaps. Illustrative of the inorganic materials that have been used as inhibitors are: sulfates, sulfides, fluorides, hydrogen peroxide; the alkali metal chromates, nitrites, phosphates, borates, tungstates, molybdates, carbonates and silicates and alkali earth metal borates.

The various inhibited anti-freeze compositions proposed to date suffer from one or more disadvantages that limit their usefulness. Some are two phase compositions and so present handling and dispensing problems. Others contain inhibitors that do not adequately retard corrosion of any of the metals used in the cooling systems. Some contain inhibitors that inhibit the corrosion of some metals but are not particularly useful in inhibiting the corrosion of other metals. Still other disadvantages of known inhibited anti-freeze compositions are poor shelf life (e.g. tendency of alkali metal silicates to gel and/or form precipitates on standing), pronounced tendency of the inhibitors to attack rubber hoses that are part of the cooling systems, excessive foaming of the coolants to which they are added, tendency of the alcohols to decompose excessively to produce acidic products and tendency of the inhibitors to lose their corrosion inhibiting properties when employed outside a narrow temperature range and/or when in use for prolonged periods.

It is an object of this invention to provide improved anti-freeze and coolant compositions for use in the cooling systems of internal combustion engines that contain inhibitors that retard the corrosion of all the metals which are suitable for use in such cooling systems.

Other objects of this invention are to provide improved anti-freeze and coolant compositions for use in the cooling systems of internal combustion engines that are single phase that do not decompose appreciably to produce acidic products that accelerate corrosion, that have good shelf-life and that contain inhibitors which do not attack the rubber parts of the cooling system, which do not cause the coolant to which they are added to foam excessively, and which are useful over a wide temperature range even after prolonged periods of service in coolants.

The compositions of this invention are inhibited compositions comprising an alcohol and, as an inhibitor, a corrosion inhibiting amount of a novel organosilicon polymer that contains: (A) from 0.1 to 99.9 parts by weight (per 100 parts by weight of the polymer) of siloxane groups represented by the formula:

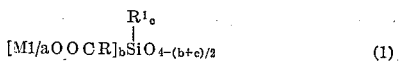

wherein M is a cation that forms a water soluble silicate; $a$ is the valence of the cation represented by M and has a value of at least one; R is an unsubstituted divalent hydrocarbon group or a divalent hydrocarbon groups containing a $M_{1/a}OOC$ group as a substituent; each $M_{1/a}OOC-$ group is connected to the silicon atom through at least two carbon atoms of the group represented by R; $R^1$ is a monovalent hydrocarbon group; $b$ has a value from 1 to 3 inclusive; $c$ has a value from 0 to 2 inclusive and $(b+c)$ has a value from 1 to 3 inclusive and (B) from 0.1 to 99.9 parts by weight (per 100 parts by weight of the polymer) of groups represented by the formula:

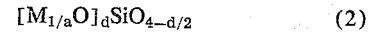

wherein M and $a$ have the above-defined meanings and $d$ has a value from 1 to 3 inclusive.

The anti-freeze compositions of this invention are anhydrous or contain, in addition to the alcohol and the organosilicon inhibitor, a relatively small amount of water while the coolant compositions of this invention contain, in addition to the alcohol and the organosilicon inhibitor, relatively large amounts of water.

In addition to groups represented by Formula 1 and formula 2, the novel organosilicon polymers used as inhibitors in the inhibited alcohol compositions of this invention can contain from 0.1 to 99.8 parts by weight (per 100 parts by weight of the polymer) of siloxane groups represented by the formula:

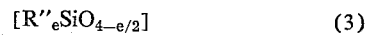

wherein R" is an unsubstituted monovalent hydrocarbon group or an amino-substituted monovalent hydrocarbon group and $e$ has a value from 0 to 3 inclusive.

The organosilicon polymers that are generally preferred as corrosion inhibitors in the inhibited alcohol compositions of this invention are those composed solely of groups represented by Formula 1 and Formula 2 which are present in the following amounts: from 12.5 parts to 50 parts by weight (per 100 parts by weight of the polymer) of groups represented by Formula 1 and from 50 parts to 87.5 parts by weight (per 100 parts by weight of the polymer) of groups represented by Formula 2. The presence in the organosilicon polymers of groups represented by Formula 3 may be desired in certain instances and, when such groups are present, it is preferred that the polymer be composed solely of groups represented by Formula 1, 2, and 3 which are present in the following amounts: from 12.5 parts to 50 parts by weight (per 100 parts by weight of the polymer) of groups represented by Formula 1, from 37.5 parts to 87.5 parts by weight (per 100 parts by weight of the polymer) of groups represented by Formula 2 and from 12.5 to 50 parts by weight per 100 parts by weight of the polymer) of groups represented by Formula 3.

The silicon atom in each group represented by Formulae 1, 2 and 3 is bonded through at least one oxygen atom to another silicon atom. In addition to the substituents indicated in these formulae, some or all of the silicon atoms in the groups represented by Formulae 1, 2, and 3 can be bonded to hydrogen atoms through oxygen (in which case the inhibitor contains the Si-OH group) and some or all of the silicon atoms in the groups represented by the Formulae 1 and 3 can be bonded to monovalent hydrocarbon groups through oxygen (in which case the inhibitors contain Si-OR$^1$ groups). It should also be recognized that the $M_{1/a}OOC-$ groups in the groups represented by the Formula 1 can undergo equilibrium reactions with the water that is present in the preferred compositions of this invention. These reactions are illustrated, in the case of KOOC— groups, by the equation:

$$H_2O + KOOC- \rightleftharpoons KOH + HOOC-$$

It should further be recognized that the $M_{1/a}OSi$ groups in the groups represented by Formula 2 can undergo equilibrium reactions with the water that is present in the preferred compositions of this invention. The latter reactions are illustrated, in the case of the KOSi groups, by the equation:

$$H_2O + KOSi \rightleftharpoons KOH + HOSi$$

Especially useful organosilicon inhibitors are those wherein the group represented by Formula 1 is more specifically represented by the formula:

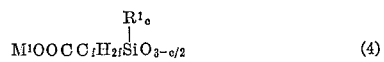   (4)

wherein $M^1$ is sodium or potassium; $f$ has a value of at least 2 and preferably has a value from 2 to 5; $R^1$ and $c$ have the above-defined meanings and the $M^1OOC-$ group is connected to the silicon atom through at least two carbon atoms of the group represented by $-C_fH_{2f}-$.

Illustrative of the cations that form water soluble silicates represented by M in Formula 1 are the various monovalent and polyvalent inorganic and organic cations that form water soluble silicates. Typical monovalent cations are alkaline metal cations [e.g. the sodium, potassium, lithium and rubidium cations]; and the tetra-organo ammonium cations [e.g. the tetra(alkyl) ammonium cations such as the tetra(methyl) ammonium cation, and the tetra(ethyl) ammonium cation; the tetra (mixed aryl-alkyl and mixed aralkyl-alkyl) ammonium cations such as the phenyltrimethyl ammonium cation and the benzyltrimethyl ammonium cation; and the tetra (hydroxyalkyl) ammonium cation such as the tetra(hydroxyethyl) ammonium cation]. Typical of polyvalent cations are those produced by converting polyamines such as guanidine or ethylene diamine to poly ammonium hydroxides. Illustrative of such polyvalent cations are $(+)H_3NC(:NH)$ $NH_3(+)$ and $$(+)H_3N(CH_2)_2NH_3(+)$$

In the case of monovalent cations, the value of $a$ in Formula 1 is one and, in the case of the polyvalent cations, the value of $a$ in Formula 1 is at least 2 and preferably 2 or 3. The most preferred cations are sodium and, more especially, potassium.

Illustrative of the unsubstituted divalent hydrocarbon groups represented by R in Formula 1 are the linear alkylene groups (for example the trimethylene, $$-(CH_2)_3-$$

and the octadecamethylene, $-(CH_2)_{18}-$ groups), the arylene groups (for example the napthylene, $-C_{10}H_6-$ and para-phenylene, $-C_6H_4-$ groups); the cyclic alkylene groups (for example the cyclohexylene, $-C_6H_{10}-$ group); the alkarylene groups (for example the tolylene, $CH_3C_6H_3=$ group) and the aralkylene group (for example the $-CH_2(C_6H_5)CHCH_2CH_2-$ group).

Illustrative of the divalent hydrocarbon groups containing a $M_{1/a}OOC$ group as a substituent represented by R in Formula 1 are the following groups:

$$-CH_2CH(COONa)CH_2CH_2-$$
$$-CH_2CH_2CH_2CH(COOK)CH_2CH_2CH_2-$$

and $$-CH_2CH_2CH(CH_2CH_2COOK)CH_2CH_2-$$

Illustrative of the monovalent hydrocarbon groups represented by $R^1$ in Formula 1 and $R''$ in Formula 3 are the linear alkyl groups (for example the methyl, ethyl, propyl, butyl and octadecyl groups), the cyclic alkyl groups (for example the cyclohexyl and cyclopentyl groups), the linear alkenyl groups (for example the vinyl and the butenyl groups), the cyclic alkenyl groups (for example the cyclopentenyl and the cyclohexenyl groups), the aryl groups (for example the phenyl and naphthyl groups), the alkaryl groups (for example the tolyl group) and the aralkyl groups (for example the benzyl and betaphenylethyl groups).

Illustrative of the amino-substituted monovalent hydrocarbon groups represented by $R''$ in Formula 3 are the aminoalkyl groups (such as the gamma-aminopropyl, delta-aminobutyl, gamma-aminoisobutyl and epsilon-aminopentyl groups), the N-hydrocarbonaminoalkyl groups (such as the N-methyl-gamma-aminoisobutyl groups and the N,N-diphenyldelta-aminobutyl group) and the N-aminoalkyl-aminoalkyl groups (such as the N-beta-aminoethyl-gamma-aminopropyl and the N-gamma-aminopropyl-gamma-aminopropyl group).

Preferred inhibitors employed in the inhibited alcohol compositions of this invention are those containing groups represented by Formulae 1 and 3 wherein each R' group and any R'' groups each individually contain from 1 to 18 carbon atoms, wherein R contains from 2 to 18 carbon atoms and wherein $d$ has an average value from 0.25 to 2.0 and, most preferably, from 0.5 to 1.5.

Illustrative of the groups represented by Formula 1 are the groups having the formulae:

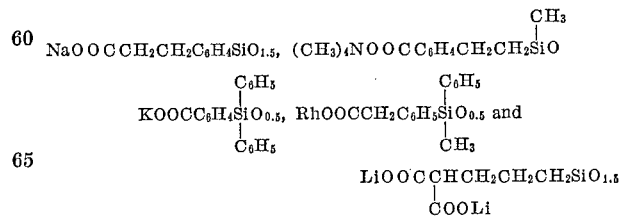

Illustrative of the groups represented by Formula 2 are the groups having the formulae: $KOSiO_{1.5}$, $NaOSiO_{1.5}$, $(KO)_2SiO$, $(CH_3)_4NOSiO_{1.5}$, $(NaO)_2SiO$, $(KO)_3SiO_{0.5}$ and $(NaO)_3SiO_{0.5}$. Illustrative of the groups represented by Formula 3 are the methylsiloxy, dimethylsiloxy, trimethylsiloxy, vinylsiloxy, diphenylsiloxy, methyl diphenylsiloxy, gamma-aminopropylsiloxy, gamma-aminoisobutylsiloxy, delta-aminobutylsiloxy, N-gamma-aminopropyl-gamma-aminopropylsiloxy $(NH_2CH_2CH_2CH_2NHCH_2CH_2CH_2SiO_{1.5})$ and N-beta-aminoethyl-gamma-aminopropylsiloxy $(NH_2CH_2CH_2NHCH_2CH_2CH_2SiO_{1.5})$ groups The organosilicon polymers employed as inhibitors in the inhibited alcohol compositions of this invention, as contrasted with other organosilicon compounds, were found to be characterized by their greater solubility in water. The solubility of these inhibitors is at least about 1 part by weight per 100 parts by weight of water but the most useful inhibitors are soluble to the extent of at least about 20 parts by weight per 100 parts by weight of water.

The amount of the organosilicon inhibitor present in the inhibited alcohol compositions of this invention will vary widely from one application to another depending upon the temperature, type of metal or metals of which the cooling system is composed, type of alcohol in the composition, pH of the cooling water, velocity of the cooling water through the cooling system during operation, solutes (e.g. electrolytes such as chlorides, sulfates and bicarbonates) or other materials in the cooling water and prior treatment or corrosion of the metal. In general, corrosion inhibiting amounts of the organosilicon inhibitor range from 0.1 part to 10 parts by weight per 100 parts by weight of the alcohol. Amounts of the organosilicon inhibitor from 1.0 part to 5.0 parts by weight per 100 parts by weight of the alcohol are preferred. The above ranges are given to indicate the generally useful and preferred amounts of the organosilicon inhibitor and may be departed from, though it is not usually desirable to do so since no advantage is gained thereby.

The alcohols that are useful in the inhibited alcohol compositions of this invention include both monohydric alcohols (such as methanol, ethanol and propanol) and polyhydric alcohols (such as ethylene glycol, diethylene glycol, triethylene glycol, propylene glycol and glycerol). These alcohols include hydrocarbon alcohols and alcohols containing ether linkages. Mixtures of alcohols are also useful in the compositions of this invention. In view of its desirable physical properties (such as its low molecular weight, its low volatility and the ready solubility of organosilicon inhibitors in its aqueous solutions) ethylene glycol is an especially useful alcohol in these compositions. Useful alcohols are those that are soluble in water. When monohydric alcohols (e.g. methanol or ethanol) are used in the compositions along with an organosilicon polymer containing groups represented by Formulae 1 and 4 wherein M is sodium or potassium, it is desirable to also employ a glycol (e.g. at least 10 parts by weight of ethylene glycol per 100 parts by weight of the monohydric alcohol) to further solubilize the polymer.

The compositions of this invention include both "concentrates" (i.e. inhibited alcohol solutions containing no water or relatively small amounts of water) and "coolants" (i.e. inhibited alcohol solutions containing relatively large amounts of water). The concentrates or anti-freeze compositions are adapted to economical shipment and storage and the coolants are adapted to use, as such, as heat transfer media in the cooling systems of internal combustion engines. In practice, the concentrate can be shipped to the point where it is to be added to the cooling system and there it can be diluted to form a coolant. Water imparts desirable properties to both the concentrate and coolant compositions of this invention, e.g. small amounts of water serve to lower the freezing point of the concentrate compositions and large amounts of water impart good heat transfer properties to the coolant compositions. The compositions of this invention can contain from 0 part by weight to 900 parts by weight of water per 100 parts by weight of the alcohol. It is desirable that the coolant compositions contain from 30 to 900 parts by weight of water per 100 parts by weight of the alcohol. It is desirable that the concentrates contain from 0.1 part to 10 parts by weight (or more desirably from 2 parts to 5 parts by weight) of water per 100 parts by weight of the alcohol. In the latter case, the amount of water with which the concentrate compositions is mixed to provide a coolant should be such that the resulting coolant composition contains from 30 parts to 900 parts by weight of water per 100 parts by weight of the alcohol. The relative amount of water and alcohol in these compositions can be varied to lower the freezing point of the compositions by the desired amount. The pH of the inhibited aqueous alcohol compositions of this invention should be greater than seven to minimize corrosion of metals with which the compositions come into contact.

If desired, various additives can be added to the inhibited alcohol compositions of this invention in particular instances for imparting special properties. By way of illustration, anti-foam agents, identifying dyes, pH indicators, conventional inhibitors, sealants which prevent leakage of the coolant from the cooling system, anti-creep agents which prevent seepage of the coolant into the crankcase and the like can be added to the compositions of this invention.

The inhibited alcohol compositions of this invention can be formed in any convenient manner, e.g. by adding an alcohol, the organosilicon inhibitor and water to a container and stirring the mixture.

The inhibited alcohol compositions of this invention inhibit the corrosion of all the metals that are suitable for use in the cooling systems of internal combustion engines. Such metals include the metals below sodium in the electromotive series (e.g. magnesium, aluminum, iron, copper, chromium, nickel, lead, tin, and zinc) as well as alloys of such metals (e.g. tin solder, brass, bronze, and steel). Such metals are solids at 25° C. and normally become corroded when in prolonged contact with aqueous alcohol solutions; particularly when the solutions are at elevated temperatures and/or contain electrolytes (e.g. acidic solutes). The compositions of this invention are particularly applicable to inhibiting corrosion of cooling systems composed of iron, brass, copper and/or aluminum and the alloys of these metals.

The organosilicon inhibitors employed in the inhibited alcohol compositions of this invention are produced by reacting (A) a siloxane containing a group represented by the formula:

$$[YR^{III}]_b \underset{|}{\overset{R^1_c}{Si}} O_{4-(b+c/2)} \quad (5)$$

wherein Y is a member selected from the group consisting of $M_{1/a}OOC-$, $HOOC-$, cyano and $R^1OOC-$ groups, $R^{III}$ is an unsubstituted divalent hydrocarbon group or a Y-substituted divalent hydrocarbon group, each group represented by Y is connected to the silicon atom through at least two carbon atoms of the group represented by $R^{III}$, and M, a, b, $R^1$, c and (b+c) have the above-defined meanings and (B) a water soluble silicate.

The siloxanes used in producing the organosilicon inhibitors employed in the inhibited alcohol compositions of this invention can be composed solely of groups represented by Formula 5 or can be composed of one or more groups represented by Formula 5 and one or more groups represented by Formula 3. In the latter case, the inhibitor produced contains the group represented by Formula 3 in addition to the groups represented by Formula 1 and Formula 2.

The starting silicates used in producing the organosilicon inhibitors employed in the inhibited alcohol compositions of this invention are water soluble and composed of cation oxide units (i.e. $M_{1/a}O$ where M is the cation of a water soluble silicate and $a$ is the valence of the cation) and silicon dioxide units (i.e. $SiO_2$). These silicates can be represented by the average formula:

$$(M_{2/a}O)(SiO_2)n \qquad (6)$$

wherein $n$ has a value from 0.5 to 4, or preferably from 1.0 to 2.5, and wherein M and $a$ have the above-defined meanings. Illustrative of these silicates are the alkali metal orthosilicates [which have the formula $$(M^1{}_2O)_2(SiO_2)$$

where $M^1$ is an alkali metal], the alkali metal metasilicates [which have the formula $(M^1{}_2O)(SiO_2)$], the alkali metal tetrasilicates [which have the formula $(M^1{}_2O)(SiO_2)_4$], the alkali metal disilicates [which have the formula $(M^1{}_2O)(SiO_2)_2$], and the tetra(organo) ammonium silicates. Specific examples of these silicates are potassium metasilicate, sodium orthosilicate, potassium disilicate, lithium orthosilicate, lithium metasilicate, lithium disilicate, rubidium disilcate, rubidium tetrasilicate, mixed silicates (e.g. $Na_2O \cdot Li_2O \cdot 2SiO_2$ and $K_2O \cdot Li_2O \cdot 4SiO_2$), tetra(methyl) ammonium silicate, tetra(ethyl) ammonium silicate, phenyltrimethyl ammonium silicate, benzyltrimethyl ammonium silicate, guanidine silicate and tetra(hydroxy-ethyl) ammonium silicate. The preferred silicates are sodium and potassium silicates, especially sodium disilicate and potassium disilicate.

The starting silicate used in producing the organosilicon inhibitor can be added to the reaction mixture as such or it can be formed in situ by adding the appropriate hydroxide (e.g. NaOH or KOH) and silica to the reaction mixture.

When the group represented by Y in Formula 5 in the starting siloxane used in producing the organosilicon inhibitor is a HOOC group or a $R^1OOC$ group, it is preferable to employ a suitable hydroxide in addition to the siloxane and the silicate. The amount of the hydroxide employed is the stoichiometric amount required to convert at least some, but preferably all, of such Y groups in the siloxane to $M_{1/a}OOC$ groups. When no alkali metal hydroxide is employed, some or all of these Y groups are converted to $M_{1/a}OOC$ groups by reaction with the cation of the starting silicate.

When the group represented by Y in Formula 5 is a CN group, it is first converted to a HOOC-group either by hydrolysis beforehand or in the reaction mixture used in forming the inhibitor. The HOOC-groups is then converted to a $M_{1/a}OOC$-group, preferably by reaction with a suitably hydroxide.

One process for producing the organosilicon inhibitors employed in the inhibited alcohol compositions of this invention includes forming the starting siloxane in situ by hydrolyzing a suitable cyano-organosilane or carbohydrocarbonoxyorganosilane and then reacting the siloxane and a suitable silicate of the above-described type. This process involves forming a mixture of water, and the silicate and a silane represented by the formula:

$$[Y^1R^{1111}]_bSiX_{4-(b+c)} \overset{R^1{}_c}{|} \qquad (7)$$

wherein $Y^1$ is a cyano group or an $R^1OOC$ group, $R''''$ is an unsubstituted divalent hydrocarbon group or a $Y'$ substituted divalent hydrocarbon group, each $Y'$ group is separated from the silicon atom by at least 2 carbon atoms of the $R^{1111}$ group and $R^1$, $b$, $c$, and $(b+c)$ have the above-defined meanings, and X is a hydrocarbonoxy group (e.g. such alkoxy groups as the methoxy, ethoxy, propoxy and butoxy groups and such aroxy groups as the phenoxy group) and maintaining the mixture at a temperature at which the water and the silane react to form the starting siloxane and at which the siloxane so formed and the silicate react to produce the inhibitor.

As discussed above, it is desirable to have a sufficient amount of a suitable hydroxide present to convert the $Y^1$ groups of the silane to the $M_{1/a}OOC$ group of the organosilicon inhibitor.

Illustrative of the silanes represented by Formula 7 are: beta - cyanoethyltriethoxysilane, beta - cyanoethyl (methyl) diethoxysilane, gamma-cyanopropyl-diphenyl (propoxy)silane; beta - carbethoxyethyltriethoxysilane, beta-carbethoxyethyl(methyl) - diethoxysilane, gamma-carbophenoxy-isobutyl-dibenzyl(phenoxy) silane and the like.

Silanes represented by the formula:

$$R''_eSiX_{4-e} \qquad (8)$$

wherein X, R'' and $e$ have the above-defined meanings and can be mixed with water, a suitable silicate, a silane represented by Formula 7 and, preferably also, a suitable hydroxide and the mixture so formed can be used in producing useful inhibitors from in situ formed siloxane copolymers containing groups represented by Formulae 3 and 5.

Illustrative of the silanes represented by Formula 8 are methyltriethoxysilane, dimethyldiethoxysilane, trimethyl-ethoxysilane, vinyltriethoxylsilane, benzyltripropoxysilane, phenyl(methyl) depropoxysilane, phenyltriethoxysilane, dephenyldiethoxysilane, $$H_2N(CH_2)Si(OC_2H_5)_3$$

and $$H_2NCH_2CH_2NH(CH_2)_3Si(OC_2H_5)_3$$

The silanes represented by Formulae 7 and 8 are partially converted to siloxanes by hydrolysis and condensation reactions when mixed with water even at room temperature. Heating the mixture of the silane and water serves to complete the reaction which is catalyzed by the silicate and any hydroxide present. The siloxanes so formed then react with the silicate. Distillation of the alcohol formed in the hydrolysis can be performed to remove the alcohol to concentrate the polymer.

The amount of water used in the latter process for producing the inhibitors used in the compositions of this invention is at least that amount required to hydrolyze at least one group in each silane represented by X in Formulae 7 and 8. Amounts of water in excess of that amount required to hydrolyze all of the groups represented by X in Formulae 7 and 8 are usually preferred since it is generally desirable to have an excess of water present to serve as a medium within which the inhibitors can be formed. Thus, from 0.5 to 2000 moles of water per mole of the silanes represented by Formulae 7 and 8 are useful but from 25 moles to 70 moles of water per mole of the silanes represented by Formulae 7 and 8 are preferred. Although other amounts of water can be used they are usually not desirable since lesser amounts result in incomplete reaction and since greater amounts result in excessive dilution of the reaction mixture.

Since the inhibitors employed in the inhibited alcohol compositions of this invention can be formed by merely adding mixtures of suitable silanes or mixtures of silanes and water-soluble silicates to water, it is often advantageous to provide substantially anhydrous mixtures containing an alcohol, a suitable silane or mixture of silanes (i.e. a silane represented by Formula 7 or a mixture of silanes represented by Formulae 7 and 8) and a water soluble silicate. These mixtures preferably contain a hydroxide of a cation that forms a water soluble silicate. Such substantially anhydrous mixtures require a minimum amount of storage space and, when needed, such mixtures can be added to the cooling water of the cooling system of an internal combustion engine and the inhibitor will be formed in the coolant. The alcohol- and inhibitor-containing coolants so produced are compositions of this invention.

The inhibitors used in the inhibited alcohol compositions of this invention can also be prepared by forming a mixture of a pre-formed siloxane containing a group represented by Formula 5 and a water soluble silicate and maintaining the mixture at a temperature at which the siloxane and the silicate react to product the reaction product. By way of illustration, a mixture can be formed containing a beta-carbethoxyethylpolysiloxane (i.e. a siloxane composed of the groups $C_2H_5OOCCH_2CH_2SiO_{1.5}$)

or a gamma-carbethoxypropylpolysiloxane (i.e. a siloxane composed of the groups $C_2H_5OOC(CH_2)_3SiO_{1.5}$) and potassium or sodium disilicate and the mixture can be maintained at a temperature at which the siloxane and the silicate react to produce an organosilicon inhibitor. Preferably potassium or sodium hydroxide is also present to convert the carbethoxy groups of the siloxane to KOOC— or NaOOC— groups.

The silanes and siloxanes employed in producing the inhibitors used in the inhibited alcohol compositions of this invention are generally known compounds that can be produced by known processes. Silanes represented by Formula 7 can generally be produced by reacting an olefinically unsaturated mono- or di-nitrile or ester with a hydrogenhalosilane in the presence of a platinum catalyst to produce an adduct having one or two nitrile or ester groups and then reacting the adduct with an alcohol to replace the silicon-bonded halogen atoms with silicon bonded hydrocarbonoxy groups (e.g.

$CH_3OOCCH_2C(COOCH_3)=CH_2$ can be reacted with $HSiCl_3$ in the presence of a platinum catalyst to produce $CH_3OOCCH_2CH(COOCH_3)CH_2SiCl_3$ which can then be reacted with ethanol to produce $CH_3OOCCH_2CH(COOCH_3)CH_2Si(OC_2H_5)_3$)

Alternately, a mono- or di-halo-organohalosilane can be reacted with an alkali metal cyanide to produce a mono- or di-cyano-organohalosilane which can then be reacted with an alcohol to produce the corresponding hydrocarbonoxy silane (e.g. gamma-chloropropyltrichlorosilane can be reacted with potassium cyanide in a diethylformamide solvent to produce gamma-cyanopropyltrichlorosilane which can then be reacted with ethanol to produce gamma-cyanopropyltriethoxysilane). The cyano groups of such silanes can be converted to ester groups by known processes. Silanes represented by Formula 8 where R" is an N-amino-organo-N-aminoorgano group can be produced by reacting a diamine and a halo-organo (hydrocarbonoxy) silane under anhydrous conditions with three moles of the diamine being present per mole of the silane at a temperature from 50° C. to 300° C. [e.g. ethylene diamine can be reacted with gamma-chloropropyltriethoxysilane under the indicated conditions to produce $$H_2NCH_2CH_2\overset{H}{N}(CH_2)Si(OC_2H_5)_3]$$

When pre-formed siloxanes containing a group represented by Formula 5 or silanes represented by Formula 8 are employed as starting materials in producing the inhibitors employed in the inhibited alcohol compositions of this invention, it is desirable to conduct the reaction in a suitable solvent for the reactants. Suitable solvents are water, ethanol-water solution, water-ethylene glycol solution, water-monoethyl ether of ethylene glycol solution and the like. Amounts of these solvents from 10 parts to 10,000 parts by weight per 100 parts by weight of the starting siloxane and silicate are useful but amounts of the solvent from 100 parts to 1000 parts by weight per 100 parts by weight of the starting siloxane and silicate are preferred.

When the reaction of the starting siloxanes and silicates used in producing the inhibitors employed in the inhibited alcohol compositions of this invention is conducted in excess water, the inhibitor is obtained in the form of an aqueous solution. It is desirable to remove any monohydric alcohol from such solution (e.g. monohydric alcohols initially used to solubilize starting silanes or produced by the hydrolysis of the starting hydrocarbonoxysilanes) by any suitable means (e.g. by distillation). Such aqueous solution are particularly useful since they have excellent shelf life and so can be stored for prolonged periods until needed. It is not necessary to separate the reaction product from the water in forming the anti-freeze compositions of this invention. The aqueous solution containing the desired amount of the inhibitor can be added to an alcohol to form the anti-freeze composition.

The temperature at which the starting siloxane (preformed or in situ formed) and silicate are maintained and at which they react to produce the inhibitors employed in the inhibited alcohol compositions of this invention can vary widely. Thus, temperatures from 20° C. to 150° C. can be used. However, temperatures from 75° C. to 115° C. are preferred. The use of other temperatures is generally undesirable since no advantage is gained thereby. When the starting siloxane is being formed in situ, the conversion of the silanes represented by Formulae 7 and 8 to siloxanes is essentially completed by heating the mixture. The alkoxy groups in the starting silanes are converted to alcohols that are usually volatilized during the heating.

The outstanding protection afforded to metals by the inhibitors present in the inhibited alcohol compositions of this invention is especially remarkable in view of the fact that alkali metal salts of aliphatic carboxylic acids are not particularly effective as corrosion inhibitors (e.g. potassium acetate was found to accelerate the corrosion of iron). The outstanding stability to gelation and precipitation (shelf life) of the compositions of this invention is especially remarkable in view of the fact that alkali metal polysilicates are not particularly stable in aqueous alcohol solutions.

The inhibitors in the inhibited alcohol compositions of this invention do not attack the rubber hoses which are a part of the cooling systems of internal combustion engines, do not decompose significantly during long periods of use, do not cause coolants to foam excessively and are useful over a wide temperature range.

The inhibited alcohol compositions of this invention that contain only an alcohol and the organosilicon inhibitor or that contain only an alcohol, water and the organosilicon inhibitor are single phase and hence they are free of the bulk handling and dispensing problems presented by two phase compositions. Of course, the compositions can, if desired, be made two phase (e.g. by the addition as an insoluble additive such as an insoluble known sealant).

Although the inhibited alcohol compositions of this invention are particularly suitable for use (as such or when diluted with water) as coolants in the cooling systems of internal combustion engines, they can be advantageously employed in other applications. Thus, the coolant compositions of this invention are generally used as heat transfer media. The concentrate compositions of this invention can be used as hydraulic fluids.

The organosilicon polymers used as corrosion inhibitors in the inhibited alcohol composition of this invention are novel compounds that have a variety of uses other than as corrosion inhibitors. By way of illustration, these novel polymers can be used as coating resins, laminating resins and molding resins according to known coating, laminating and molding procedures.

The novel organosilicon polymers of this invention are not limited in their usefulness as corrosion inhibitors to aqueous alcohol solutions which come into contact with metals. These novel organosilicon polymers are generally useful as inhibitors in any aqueous liquid which comes into contact with metals. Hence these polymers are admirably suited for use in the novel process of this invention for inhibiting the corrosion of metals that come into contact with aqueous liquids. The novel process of this invention involves adding to the aqueous liquid a corrosion inhibiting amount of the above-described organosilicon polymers.

In the practice of the process of this invention the organosilicon inhibitor is added to an aqueous liquid and, for best results, the inhibitor is then uniformly dispersed throughout the liquid. Any suitable means can be used to disperse the inhibitor throughout the liquid. Thus, in the case of moving liquids that are in contact with the metal to be protected, the inhibitor employed in this invention can be added to the liquid while the liquid is in use and dispersion of the inhibitor throughout the liquid is achieved by the movement of the liquid. However, the inhibitor can be added to the liquid (prior to the use of the liquid in contact with the metal to be protected) and the inhibitor can be dispersed throughout the liquid by stirring the liquid. This latter procedure is preferred where the liquid is to be stored or where the liquid undergoes little movement when in use. These procedures allow the inhibitor to readily dissolve in the water or aqueous solution.

In the process of this invention, the organosilicon inhibitor can be added as such to the aqueous liquid. Alternately, materials can be added to the aqueous liquid which react with the water in the liquid to produce the inhibitor in situ. By way of illustration, a silane represented by Formula 7 or a mixture of silanes represented by Formulae 7 and 8 can be added to an aqueous liquid along with a water soluble silicate to produce the inhibitor in the liquid. As a further illustration, a siloxane composed solely of groups represented by Formula 5 or composed both of groups represented by Formulae 5 and 3 can be added to an aqueous liquid along with a water soluble silicate to produce the inhibitor in the liquid. In forming the inhibitor in situ, it is preferred to add a suitable hydroxide along with the other reactants.

The process of this invention is generally applicable to the protection of metals that come into contact with liquids containing water. Suitable liquids are pure water, aqueous solutions containing inorganic solutes and solutions containing water and water soluble organic compounds, especially water soluble or miscible organic liquids. Illustrative of suitable aqueous solutions containing inorganic solutes are aqueous sodium or potassium chloride refrigerating solutions, corrosive well water or river water containing normal chlorides, carbonates and sulfates which may be used as process or cooling water in industry, and the like. Illustrative of suitable solutions containing water and a water soluble organic liquids are solutions containing water and monohydric or polyhydric alcohols (e.g. methanol, ethanol, propanol, ethylene glycol, propylene glycol and glycerol), hydroxyl and alkoxy end-blocked polyalkylene oxides (such as polyethylene oxide), sulfoxides (such as methylsulfoxide), formamides (such as dimethylformamide) and cyclic ethers free of olefinic unsaturation (such as tetrahydrofuran dioxane and the like). Suitable solutions containing water and a water soluble organic liquid should contain at least 0.1 part by weight, or preferably at least 5.0 parts by weight, of water per 100 parts by weight of the water and the organic liquid.

The process of this invention is generally applicable to the protection of metals and alloys that are used in industrial processes and apparatus. Metals whose corrosion is retarded by the process of this invention include the metals below sodium in the electromotive series (e.g. magnesium, aluminum, copper, chromium, iron, manganese, nickel, lead, silver, tin, beryllium and zinc) as well as the alloys of such metals (e.g. brass, bronze, solder alloys, steel and the like). Such metals are solids at 25° C. and normally become corroded when in prolonged contact with water, particularly when the water is at elevated temperatures and/or contains electrolytes (e.g. acidic solutes). The process of this invention is particularly applicable to the protection of brass, iron, copper and aluminum.

The amount of the organosilicon inhibitor employed in the process of this invention is dependent upon the factors mentioned above in connection with the amount of inhibitor used in the compositions of this invention. Generally, from 0.01 part per 10 parts by weight of the inhibitor per 100 parts by weight of the aqueous liquid to which the inhibitor is added are useful. Preferable from 0.5 part to 2.5 parts by weight of the inhibitor per 100 parts by weight of the aqueous liquid are used.

Compared with known processes for preventing corrosion of metals that are in contact with water, the process of this invention provides numerous advantages. Thus, the inhibitors used in the process of this invention can be added to a wide variety of aqueous solutions and inhibit a wide variety of metals. In addition, the inhibitors used in the process of this invention are effective over a wide temperature range and these inhibitors do not cause the liquids in which they are employed to foam excessively. Furthermore, these inhibitors do not promote the decomposition of organic compounds present in the water nor do they attack organic materials with which the water may come in contact.

The process of this invention is applicable to preventing the corrosion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The process of this invention is particularly applicable to inhibiting the corrosion of the cooling systems of internal combustion engines in contact with aqueous alcohol coolant compositions.

The improvements in corrosion inhibition resulting from the use of the compositions and process of this invention were found and evaluated by elaborate laboratory tests designed to simulate field conditions, by carefully controlled dynamometer tests in full scale automotive equipment and by tests in operating automobiles. In the examples given below, all three types of evaluation tests were employed.

TWO-HUNDRED HOUR CORROSION TEST

This is a laboratory test which has proven over many years to be useful in evaluating inhibitors for use in aqueous alcohol anti-freeze solutions such as are used in the cooling systems of internal combustion engines. The test involves immersing clean strips of metal (usually iron, aluminum, brass and copper) and a brass coupon on which is a spot of solder, composed of 50 wt.-percent lead and 50 wt.-percent tin, in the test fluid with heating and aeration for a period of 200 hours. After this exposure, the specimens are cleaned and corrosion of the metal strips is measured by weight loss in milligrams. The corrosion of the spot of solder on the brass coupon is given a rating (called solder spot rating, abbreviated SS in the examples) by visual inspection with a rating of 6 indicating little or no corrosion and a rating of 0 indicating very severe corrosion.

Each test unit consists of a 600 ml. glass beaker equipped with a reflux condenser and an aeration tube. The test specimens are cut from $\frac{1}{16}$ inch sheet stock usually with a total surface area of about nine (9) square inches. Test temperature is 100° C. and aeration rate is 0.028 cubic foot per minute. Specimens are separated with Z shaped glass rods and are covered with 350 cc. of solution. The water used in preparing test solutions has 100 parts per million added of each of bicarbonate, chloride, and sulfate ions as sodium salts. This gives an accelerated corrosion rate that simulates the corrosion rate that prevails when natural water is used to dilute anti-freeze compositions in actual practice. Duplicate tests are run simultaneously and both values or the average values of weight loss, final pH and final RA (defined below) are given.

PRE-RUSTED ENGINE TESTS

In the pre-rusted engine test a solution of acetic acid dissolved in an aqueous ethylene glycol solution is added to the cooling system of a standard automobile engine mounted on a dynamometer stand and the engine run for about 35 hours to cause rusting. Then the acetic acid solution is drained, the test liquid is added and the engine test is run as described below. This test evaluates the performance of the test liquid under conditions of severe rusting.

The engines used in the pre-rusted engine test are equipped with cooling systems that are under atmospheric pressure. This allows for evaluation of the tendency of the test coolants to foam under conditions that are favorable to severe foaming.

Metal specimens (about 4.5 sq. in. surface area) are inserted into the cooling system, usually in the radiator hoses, and results are evaluated by measuring weight losses of the metal specimens after measured time periods of operation which are equivalent to certain mileage. Samples of the coolants are withdrawn periodically and their pH, glycol content, and reserve alkalinity (as defined below) are determined. The compositions tested are diluted with tap water until the volume ratio of alcohol to water is about 1:1. The engine is run at a rate equivalent to 60 m.p.h. on a level road.

ROAD TEST

The cooling system of a standard automobile engine that is mounted in a standard automobile is cleaned with a cleaning solution. Metal specimens are mounted so that they will be in contact with the coolant. The coolant to be road tested is added to the cooling systems and the automobile is driven an average of about 640 miles per day. Some of the metal specimens are withdrawn periodically during 30,000 miles of operation of the automobile. The corrosion of the specimens is measured and new specimens are reinserted in the coolant and the test is continued. Other metals specimens are left undisturbed for the entire 30,000 miles and these are withdrawn and their corrosion measured at the end of that time. The coolants contain, in addition to inhibitors, 50 parts by volume of water and 50 parts by volume of ethylene glycol.

The "reserve alkalinity" of an anti-freeze composition is a measure of the ability of the composition to resist a decrease in pH due to the presence of acidic materials such as are produced by the decomposition of alcohols. Reserve alkalinity (abbreviated RA in the examples) is determined by titrating a sample (about 10 cc.) of the composition with 0.1 N aqueous hydrochloric solution. From the number of milliliters of the acid actually required to neutralize the sample, the number of milliliters of acid that would be required to neutralize 100 milliliters of the composition if it contained a water to alcohol ratio of 2:1 on a volume basis is computed and this latter number is the reserve alkalinity of the composition.

In the following examples, BR is used as an abbreviation for brass. All of the inhibited alcohol compositions of this invention described in the examples below were single phase compositions.

The following examples illustrate the present invention.

Example I

The reactor was a 1,000 ml., three-necked, round bottom glass flask fitted with a thermometer, a distillation column equipped with a still head and a dropping funnel was used. Stirring was accomplished by a magnetic stirrer and stirring unit. Heat was applied with an electrical heating unit.

An aqueous potassium metasilicate solution, which contained 107.2 grams $K_2SiO_3$ (formed by dissolving KOH and $SiO_2$ in water) and 602.1 grams water, was added to the 1,000 ml. flask. Potassium hydroxide (23.4 grams- 86.6 wt. percent purity) was added to the flask and, when the potassium hydroxide had completely dissolved, 95.78 grams betacarbethoxyethyltriethoxysilane $$[C_2H_5OOCCH_2CH_2Si(OC_2H_5)_3]$$

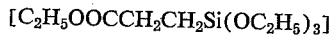

was added and a heterogeneous, two-phase mixture was formed. The amount of potassium hydroxide present was sufficient to convert all $C_2H_5OOC-$ groups of the silane to $KOOC-$ groups. The mixture was heated to boiling and refluxed for three hours. A homogeneous one-phase solution resulted. Water and alcohol were distilled from the solution until a total of 411.7 grams of distillate was collected. Then the solution was heated at reflux (104° C.) for 12 hours. A clear aqueous solution of an organosilicon inhibitor produced from the silicate and the in situ formed siloxane was obtained. The solution contained 166.3 grams of an organosilicon polymer dissolved in 249.5 grams water. This polymer is designated "Inhibitor A" and was composed of $$KOOCCH_2CH_2SiO_{1.5}$$

groups and $(KO)_2SiO$ groups.

Example II

To a three-liter, three-necked glass flask fitted with an agitator, a thermometer well and a distillation column equipped with a still head and receiver were added potassium hydroxide (64.8 grams-86.6 wt.-percent purity) and 645 grams of water. The mixture was agitated and, when all of the potassium hydroxide had dissolved, beta-carbethoxyethyltriethoxysilane (264.4 grams), vinyltriethoxysilane (190.3 grams) and, as a solvent, ethylene glycol (803.6 grams) were added to the flask. The amount of potassium hydroxide present was sufficient to convert all $C_2H_5OOC$ groups to $KOOC-$ groups. The mixture so formed was heated at reflux for one hour while agitated. The heating was continued for three hours, the temperature in the flask rose from 86° C. to 201° C. and volatile materials (1005.9 grams) were distilled. These volatile materials were mainly the ethanol formed by the hydrolysis of the silanes and water and a small amount of ethylene glycol. The product was 242.3 grams of a siloxane dissolved in 719 grams of ethylene glycol.

A part of the siloxane solution so formed (104.2 grams) was mixed with an aqueous solution (246.5 grams) containing 30 wt.-percent $K_2Si_2O_5$ and the mixture so formed was allowed to stand at room temperature for several days to produce an organosilicon polymer. This polymer is designated "Inhibitor J" and was composed of $KOOCCH_2CH_2SiO_{1.5}$, $CH_2=CHSiO_{1.5}$ and $KOSiO_{1.5}$ groups.

Example III

Beta-cyanoethyltriethoxysilane (217 grams) was added to a one liter, three-necked, round bottomed glass flask fitted with an agitator, thermometer well, argon inlet tube, short packed column and still head. Potassium hydroxide (66.5 grams-85.5 wt.-percent purity) dissolved in deionized water (100 grams) was slowly added to the flask. Ethylene glycol (234 grams) and additional deionized water (227 grams) were added and a hazy solution was so formed in the flask. The contents of the flask were heated to reflux and became a clear solution in ten minutes. Ethanol, ammonia and water (196 grams) were distilled from the flask as it was heated for 6.5 hours while sparged with argon. The contents of the flask was then cooled to room temperature and filtered to produce, as a filtrate, a water-white solution (618.5 grams) containing 26.4 wt.-percent of a siloxane polymer composed of $KOOCCH_2CH_2SiO_{1.5}$ groups dissolved in a mixture of ethylene glycol (37.9 wt.-percent) water (35.7 wt.-percent).

A part of the solution so produced (111.5 grams) was mixed with a solution (235 grams) containing 30 wt.-percent $K_2Si_2O_5$ dissolved in water. The mixture so formed was allowed to stand for several days to produce an organosilicon polymer. This polymer is designated "Inhibitor L" and was composed of $KOOCCH_2CH_2SiO_{1.5}$ groups and $KOSiO_{1.5}$ groups.

*Example IV*

Following the general procedure described in Example 1, several other organosilicon inhibitors that are useful in the compositions of this invention (Inhibitors B through I were produced. The starting materials used in producing these inhibitors and Inhibitor A are shown in Table I.

Following the general procedure described in Example II, another organosilicon inhibitor that is useful in the composition of this invention was produced (Inhibitor K). The starting materials used in producing this inhibitor, as well as those used in producing Inhibitors J and L, are shown in Table I.

Another organosilicon inhibitor was prepared as follows. To a two liter beaker equipped with a magnetic stirrer there were added 930 grams of ethylene glycol and a solution containing 15.2 grams of $K_2Si_2O_5$ and 4.0 grams of KOH (86.6 wt.-percent pure) dissolved in 35.4 grams of water. The mixture so formed was stirred while 10 grams of $$CH_3OOCCH_2CH(COOCH_3)CH_2Si(OC_2H_5)_2$$

were added thereto. After this addition the mixture was initially turbid but, upon continued stirring, the mixture became clear. The clear solution so formed was allowed to stand for two days. There was so produced a solution of organosilicon polymer composed of $KOOCCH_2CH(COOK)CH_2SiO_{1.5}$ groups and $KOSiO_{1.5}$ groups. This inhibitor is designated "Inhibitor M."

TABLE I

| Inhibitor | Starting Silane(s) | | Grams 86.6% KOH | Starting Silicate | |
|---|---|---|---|---|---|
| | Formula | Grams | | Formula | Grams |
| A | $C_2H_5OOCCH_2CH_2Si(OC_2H_5)_3$ | 95.8 | 23.4 | $K_2SiO_3$ | 107.2 |
| B | $C_2H_5OOCCH_2CH_2Si(OC_2H_5)_3$ | 37.5 | 9.2 | $K_2Si_2O_5$ | 115.2 |
| C | $C_2H_5OOCCH_2CH_2Si(OC_2H_5)_3$ | 60.2 | 14.7 | $[K_2O][SiO]_{2.5}$ | 106.4 |
| D | $C_2H_5OOCCH_2CH_2Si(OC_2H_5)_3$ | 53.2 | 13.0 | $[K_2O][SiO]_{3.0}$ | 106.3 |
| E | $C_2H_5OOCCH_2CH_2Si(OC_2H_5)_3$ | 95.8 | 23.4 | $K_2Si_2O_5$ | 99.2 |
| F | $C_2H_5OOCCH_2CH_2Si(OC_2H_5)_3$ | 119.4 | 29.2 | $K_2Si_2O_5$ | 83.4 |
| G | $C_2H_5OOCCH_2CH_2Si(OC_2H_5)_3$ | 39.1 | 9.7 | $K_2Si_2O_5$ | 57.5 |
| H | $C_2H_5OOCCH_2CH_2Si(OC_2H_5)_3$ | 47.9 | 11.7 | $K_2Si_2O_5$ | 107.2 |
| I | $C_2H_5OOC(CH_2)_3Si(CH_3)(OC_2H_5)_2$ | 97.4 | 25.7 | $K_2Si_2O_5$ | 161.3 |
| J | $C_2H_5OOCCH_2CH_2Si(OC_2H_5)_3$ and $CH_2=CHSi(OC_2H_5)_3$ | 264.4<br>190.3 | 64.8 | $K_2Si_2O_5$ | 72.9 |
| K | $C_2H_5OOCCH_2CH_2Si(OC_2H_5)_3$ and $CH_3Si(OC_2H_5)_3$ | 264.4<br>178.3 | 64.8 | $K_2Si_2O_5$ | 74.8 |
| L | $NCCH_2CH_2Si(OC_2H_5)_3$ | 217 | | $K_2Si_2O_5$ | 70.5 |
| M | $CH_3OOCCH_2CHCH_2Si(OC_2H_5)_3$<br>\|<br>$COOCH_3$ | 10 | 4.0 | $K_2Si_2O_5$ | 15.2 |

The groups present in these various inhibitors and the relative amounts of these groups are shown in Table II.

TABLE II

| Inhibitor | Siloxane Groups | | Groups having the formula $(KO)_dSiO_{4-d/2}$ | |
|---|---|---|---|---|
| | Formula | Parts* | Value of d | Parts* |
| A | $KOOCCH_2CH_2SiO_{1.5}$ | 35.5 | 2 | 64.5 |
| B | $KOOCCH_2CH_2SiO_{1.5}$ | 16.7 | 1 | 83.3 |
| C | $KOOCCH_2CH_2SiO_{1.5}$ | 25.9 | 0.8 | 74.1 |
| D | $KOOCCH_2CH_2SiO_{1.5}$ | 23.6 | 0.67 | 76.4 |
| E | $KOOCCH_2CH_2SiO_{1.5}$ | 37.2 | 1 | 62.8 |
| F | $KOOCCH_2CH_2SiO_{1.5}$ | 46.9 | 1 | 53.1 |
| G | $KOOCCH_2CH_2SiO_{1.5}$ | 29.5 | 1 | 70.5 |
| H | $KOOCCH_2CH_2SiO_{1.5}$ | 31.0 | 1 | 69.0 |
| I | $KOOC(CH_2)_3Si(CH_3)O$ | 21.6 | 1 | 78.4 |
| J | $KOOCCH_2CH_2SiO_{1.5}$ and $CH_2=CHSiO_{1.5}$ | 17.6<br>8.5 | 1 | 73.9 |
| K | $KOOCCH_2CH_2SiO_{1.5}$ and $CH_3SiO_{1.5}$ | 17.9<br>7.2 | 1 | 74.9 |
| L | $KOOCCH_2CH_2SiO_{1.5}$ | 29.5 | 1 | 70.5 |
| M | $KOOCCH_2CHCH_2SiO_{1.5}$<br>\|<br>$COOK$ | 34.6 | 1 | 65.4 |

*By weight per 100 parts by weight of the inhibitor.

Example V

The 200-hour corrosion test was run on compositions of this invention containing Inhibitors A to M inclusive. The test liquids contained 100 parts by weight of ethylene glycol and 180 parts by weight of water to which were added the amount of inhibitor set forth in Table III. The compositions and test results are detailed in Table III.

*Formula C.*—This is a reference coolant and it is produced by diluting a commercially available two-phase anti-freeze concentrate composition that has achieved remarkable commercial success. The concentrate is composed of a water-ethylene glycol phase containing an alkaline earth borate as an inhibitor and a complex organic acid phase as another inhibitor.

TABLE III

| Inhibitor | Parts[1] | pH | | RA | | Wt. Losses mg. per 9 sq. in. | | | | S.S. |
|---|---|---|---|---|---|---|---|---|---|---|
| | | I[2] | F[3] | I | F | Fe | Al | Br | Cu | |
| A | 1.6 | 10.9 | 10.7 | 55 | 28 | 2 | 0 | 0 | 2 | 6 |
| | | | 10.7 | | 27 | 4 | 0 | 1 | 2 | 6 |
| B | 1.86 | 10.8 | 10.7 | 59 | 53 | 4 | 0 | 4 | 9 | 6 |
| | | | 10.8 | | 55 | 5 | 0 | 5 | 11 | 6 |
| C | 2.38 | 10.6 | 10.7 | 60 | 54 | 3 | 0 | 6 | 14 | 5.5 |
| | | | | | 55 | 3 | 0 | 5 | 27 | 5.5 |
| D | 2.60 | 10.9 | 10.8 | 58 | 54 | 2 | 1 | 3 | 23 | 5.5 |
| | | | | | 53 | 4 | 1 | 6 | 48 | 5.5 |
| E | 2.47 | 10.5 | 11.0 | 62 | 61 | 2 | 1 | 2 | 5 | 5 |
| | | | 10.9 | | 63 | 2 | 1 | 4 | 6 | 5.5 |
| F | 3.41 | 10.9 | 10.9 | 74 | 71 | 3 | 1 | 3 | 4 | 5.5 |
| | | | 10.8 | | 71 | 2 | 1 | 4 | 5 | 5.5 |
| G | 2.20 | 11.1 | 11.1 | 62 | 53 | 4 | 1 | 3 | 5 | 5 |
| | | | 11.1 | | 56 | 3 | 1 | 4 | 6 | 5 |
| H | 2.40 | 11.1 | 11.1 | 66 | 56 | 2 | 0 | 4 | 8 | 5.5 |
| | | | 11.1 | | 58 | 2 | 1 | 5 | 11 | 5.5 |
| I | 1.64 | 10.9 | 10.7 | 33 | 28 | 2 | 0 | 0 | 2 | 6 |
| | | | 10.7 | | 27 | 4 | 0 | 1 | 2 | 6 |
| J[4] | 2.10 | 11.1 | 11.2 | 57 | 50 | 2 | 0 | 6 | 9 | 5.5 |
| K[4] | 2.07 | 11.1 | 11.4 | 57 | 60 | 3 | 0 | 10 | 40 | 5.5 |
| L | 2.20 | 11.4 | 11.0 | 56 | 50 | 3 | 0 | 2 | 4 | 5.5 |
| | | | 11.1 | | 52 | 3 | 1 | 3 | 9 | 5 |
| | | | 11.8 | | 54 | 5 | 1 | 4 | 10 | 5.5 |
| | | | 11.7 | | 55 | 5 | 1 | 5 | 12 | 5 |
| M | 2.37 | 11.0 | 10.6 | 37 | 32 | 2 | 0 | 3 | 13 | 5.5 |
| | | 11.0 | 10.6 | | 32 | 4 | 1 | 3 | 12 | 5.5 |

[1] By weight per 100 parts by weight of the ethylene glycol.
[2] Initial value.
[3] Final value.
[4] Average of two runs.

These results, when compared to the reference data of Table IV below, show that the corrosion protection provided by the compositions of this invention are generally superior to the protection provided by the reference fluids.

The 200-hour corrosion test was run using uninhibited aqueous ethylene glycol and three reference coolants containing 100 parts by weight of ethylene glycol and 180 parts by weight of water. The compositions of these reference coolants are described below. Test results are shown in Table IV.

*Formula A.*—This is a reference coolant consisting of aqueous ethylene glycol without any inhibitors or additives.

*Formula B.*—This is a reference coolant consisting of water, an alkali metal borate as an inhibitor and ethylene glycol. It is produced by diluting commercially available anti-freeze concentrate composition.

The corrosion values given in Table IV are the average values of two experiments.

TABLE IV

| Reference | pH | | RA[1] | | Wt. Losses, mg./9 in.[2] | | | | S.S.[4] |
|---|---|---|---|---|---|---|---|---|---|
| | I[2] | F[3] | I | F | Fe | Al | Br | Cu | |
| Formula A[5] | 7.1 | 6.2 | 0 | 0 | 663 | 10 | 115 | 52 | 4.5 |
| Formula B | 7.8 | 7.5 | 60 | 55 | 85 | 7 | 15 | 23 | 5 |
| Formula C | 8.0 | 7.6 | 55 | 48 | 4 | 4 | 10 | 16 | 5.5 |

[1] Reserve Alkalinity.
[2] I denotes initial value.
[3] F denotes final value.
[4] Solder Spot Rating.
[5] Average of four runs.

The results obtained with uninhibited aqueous ethylene glycol (Formula A) and with aqueous ethylene glycol containing an alkali metal borate inhibitor (Formula B) show the room for more corrosion inhibition in such systems. Formula C exhibited satisfactory corrosion inhibition but it is a two-phase system and presents bulk handling and dispensing problems in commercial practice.

Example VI

The 200-hour corrosion test was used to evaluate three compositions of this invention (aqueous ethylene glycol inhibited with Inhibitors A, F and G) and, for reference purposes, two compositions containing inorganic silicates ($K_2SiO_3$ and $K_2SiO_5$). The indicated inhibitors were dissolved in solutions containing 180 parts by weight of water and 100 parts by weight of ethylene glycol.

Inhibitor A was used in amounts that provided an equivalent of 1.1 parts of $K_2SiO_3$ combined as $(KO)_2SiO$ in the organosilicon polymer. Inhibitors F and G were used in amounts that provided an equivalent of 1.6 parts of $K_2Si_2O_5$ combined as $KOSiO_{1.5}$ in the organosilicon polymer. The results are shown in Table V.

These results, when compared to results shown below where a known antifreeze concentrate composition was diluted and employed as a coolant, demonstrate that considerably less corrosion occurs when compositions of this invention are employed.

A pre-rusted engine test was run on a commercially

TABLE V

| Run | Inhibitor | Amount* | pH | | RA | | | Wt. Losses, mg./9 in.² | | | |
|---|---|---|---|---|---|---|---|---|---|---|---|
| | | | I | F | I | F | Fe | Al | Br | Cu | S.S. |
| 1 | Inhibitor A (from $K_2SiO_3$) | 1.6 | 10.9 | 10.7 | 55 | 28 | 2 | 0 | 0 | 2 | 6 |
| | | | 10.9 | 10.7 | | 27 | 4 | 0 | 1 | 2 | 6 |
| 2 | $K_2SiO_3$ | 1.1 | 11.5 | 11.4 | 55 | 39 | 11 | 0 | 41 | 66 | 5.5 |
| 3 | Inhibitor F (from $K_2Si_2O_5$) | 2.5 | 10.5 | 11.0 | 62 | 61 | 2 | 1 | 2 | 5 | 5 |
| | | | 10.5 | 10.9 | | 63 | 2 | 1 | 4 | 6 | 5.5 |
| 4 | Inhibitor G (from $K_2Si_2O_5$) | 2.2 | 11.1 | 11.1 | 62 | 53 | 4 | 1 | 3 | 5 | 5 |
| | | | 11.1 | 11.1 | | 56 | 3 | 1 | 4 | 6 | 5 |
| 5 | $K_2Si_2O_5$ | 1.6 | 11.2 | 11.2 | 60 | 47 | 12 | 4 | 6 | 12 | 6 |
| | | | 11.2 | 11.3 | | 49 | 10 | 4 | 13 | 22 | 6 |

*Parts per 100 parts per weight of the ethylene glycol.

These results show that the protection of the metals obtained using the compositions of this invention is superior to the protection using compositions containing inorganic silicates. The differences in the amounts of inhibitors employed does not account for the differences in corrosion protection. In each run over 1.0 parts by weight of inhibitor was used and experience has shown that substantially no improvement in corrosion protection is obtained in this test by employing over 1.0 part of these inhibitors.

*Example VII*

A coolant composition of this invention was tested in the pre-rusted engine test. The composition initially contained 100 parts by weight of water and 100 parts by weight of ethylene glycol and 1.1 parts by weight of Inhibitor G. The following results were obtained:

TABLE VI

| Test Miles | Solution Analysis Data | | |
|---|---|---|---|
| | pH | Weight-percent Glycol* | R.A. |
| 0 | 11.3 | 50 | 43 |
| 15 | 11.1 | 50 | 41 |
| 60 | 11.1 | 50 | 34 |
| 1,200 | 10.9 | 50 | 22 |
| 2,400 | 10.7 | 48 | 20 |
| 3,600 | 10.5 | 46 | 18 |
| 5,000 | 10.4 | 46 | 18 |
| 10,000 | 9.9 | 46 | 13 |
| 15,000 | 9.3 | 42 | 11 |
| 50,000 | 9.4 | 24 | 8 |

*Decrease due to leakage and sampling for tests (e.g. R.A. test) and replacement with water.

TABLE VII.—CORROSION DATA-METAL SPECIMENS IN RADIATOR HOSE

A. Specimens Cleaned and Weighed Every 5,000 Miles

| Test Miles | Weight Losses (mg./4.5 sq. in.) | | |
|---|---|---|---|
| | Fe | Al | Cu |
| 5 | 1 | 1 | 1 |
| 10,000 | 2 | 1 | 6 |
| 15,000 | 3 | 2 | 17 |
| 50,000 | 97 | 17 | 136 |

B. Specimens Cleaned and Weighed Only at Indicated Mileages

| | | | |
|---|---|---|---|
| 5,000 | 1 | 1 | 1 |
| 15,000 | 2 | 0 | 4 |
| 50,000 | 55 | 3 | 9 | available single phase antifreeze concentrate composition that has been diluted to form a coolant (Formula B). This composition contains water, an alkali metal borate and ethylene glycol. The results are shown in Tables VIII and IX.

TABLE VIII

| Mileage | Solution Analysis | | |
|---|---|---|---|
| | pH | Weight-percent Glycol | R.A. |
| 15 | 7.4 | 51.0 | 48 |
| 60 | 7.3 | 51.0 | 41 |
| 540 | 7.2 | 50.0 | 37 |
| 1,200 | 7.2 | 49.0 | 34 |
| 2,400 | 7.1 | 49.0 | 26 |
| 3,600 | 7.2 | 47.0 | 26 |
| 5,000 | 7.0 | 44.5 | 23 |
| 10,000 | 6.7 | 43.0 | 11 |
| 15,000 | 6.2 | 40.0 | 4 |

TABLE IX.—CORROSION

[Specimens cleaned and weighed every 5,000 miles]

| Mileage | Weight Losses (mg. per 4.5 sq. in.) | | | |
|---|---|---|---|---|
| | Fe | Al | Cu | S.S. |
| 5,000 | 170 | 169 | 32 | 6 |
| 10,000 | 319 | 351 | 53 | 5.5 |
| 15,000 | 531 | 477 | 74 | 5.5 |

*Example VIII*

A coolant of this invention (containing one part by weight of Inhibitor G per 100 parts by weight of ethylene glycol) and two coolants (Formula B and Formula C) prepared by diluting two commercially available antifreeze concentrates were subjected to the Road Test. Each coolant was tested in one Make I automobile and in one Make II automobile. The results are shown in Table X.

TABLE X.—ROAD TEST

| Mileage | Weight Loss (mg./4.5 sq. in.) | | | | | | |
|---|---|---|---|---|---|---|---|
| | Specimens | | | | | Cast Aluminum Alloys | |
| | Fe | Al | Br | Cu | S.S.[1] | #13 [2] | 380 [3] |
| Coolant of this Invention in Make I | | | | | | | |
| 10,000 | 2 | 0 | 7 | 13 | 6 | 8 | 12 |
| 20,000 | 6 | 1 | 13 | 22 | 5.5 | 20 | 31 |
| 30,000 | 11 | 1 | 24 | 31 | 5.5 | 29 | 51 |
| 30,000 [4] | 2 | 1 | 9 | 16 | 5.5 | 24 | 39 |
| Formula B in Make I | | | | | | | |
| 10,000 | 7 | 118 | 32 | 33 | 5 | 93 | 97 |
| 20,000 | 14 | 202 | 41 | 43 | 5.5 | 164 | 157 |
| 30,000 | 19 | 288 | 46 | 60 | 5.5 | 232 | 223 |
| 30,000 [4] | 18 | 149 | 31 | 45 | 5.5 | 89 | 69 |
| Formula C in Make I | | | | | | | |
| 10,000 | 8 | 20 | 10 | 16 | 5 | 21 | 13 |
| 20,000 | 13 | 103 | 29 | 37 | 5 | 100 | 87 |
| 30,000 | 38 | 192 | 32 | 46 | 5 | 180 | 162 |
| 30,000 [4] | 30 | 99 | 13 | 22 | 5 | 102 | 89 |
| Coolant of this Invention in Make II | | | | | | | |
| 10,000 | 1 | 0 | 3 | 9 | 6 | 6 | 10 |
| 20,000 | 1 | 1 | 4 | 21 | 6 | 9 | 18 |
| 30,000 | 12 | 1 | 7 | 25 | 6 | 10 | 19 |
| 30,000 [4] | 0 | 0 | 4 | 12 | 6 | 6 | 17 |
| Formula B in Make II | | | | | | | |
| 10,000 | 32 | 78 | 5 | 8 | 5.5 | 109 | 85 |
| 20,000 | 53 | 167 | 15 | 36 | 4.5 | 219 | 185 |
| 30,000 | 118 | 248 | 35 | 63 | 4.5 | 311 | 282 |
| 30,000 [4] | 82 | 116 | 11 | 25 | 5 | 128 | 144 |
| Formula C in Make II | | | | | | | |
| 10,000 | 1 | 1 | 5 | 18 | 6 | 4 | 19 |
| 20,000 | 25 | 29 | 10 | 24 | 5 | 41 | 56 |
| 30,000 | 42 | 76 | 18 | 31 | 5 | 105 | 122 |
| 30,000 [4] | 16 | 45 | 8 | 13 | 5.5 | 59 | 64 |

[1] Solder Spot Rating: 6=excellent; 1=poor.
[2] 12% Si and 88% Al.
[3] 9% Si, 3.5% Cu and 87.5% Al.
[4] Specimens undisturbed until end of test.

Example IX

Liquids containing inhibitors dissolved in solutions composed of from 1.5 to 6.3 parts by weight of water and from 95 to 98 parts by weight of ethylene glycol were stored in glass bottles for prolonged periods of time at 100° C. in order to test their stability during storage (shelf life). The results are shown in Table XI. The results show that the shelf lives of the concentrate compositions of this invention are longer than the shelf lives of concentrate compositions containing non-silicone alkali metal silicates.

TABLE XI

| Inhibitor | $H_2O$ [1] | Amount [1] | Gelation Time, Days at 100° C. |
|---|---|---|---|
| $K_2SiO_3$ | 2.6 | 1.12 | 60 |
| Inhibitor A | 3.0 | 1.64 | [2] 180 |
| $K_2Si_2O_5$ | 5.0 | 2.11 | 1 |
| Inhibitor G | 4.1 | 2.22 | [2] 180 |
| Inhibitor C | 4.5 | 2.38 | [2] 180 |
| Inhibitor E | 4.9 | 2.47 | [2] 180 |
| Inhibitor F | 6.3 | 3.41 | [2] 180 |
| Inhibitor J | 1.5 | 2.10 | 31 |
| Inhibitor K | 1.5 | 2.07 | 31 |

[1] Parts by weight per 100 parts by weight of ethylene glycol.
[2] No gelation apparent at end of indicated test period.

Generally the shelf life of potassium silicates is proportional to the $K_2O$ and $SiO_2$ ratio of the silicate. With increasing $SiO_2$ content the shelf life decreases. The $K_2O$ to $SiO_2$ ratio of Inhibitor A is the same as in $K_2SiO_3$, and the $K_2O$ to $SiO_2$ ratio in Inhibitors G, C, E, F, J and K the same as in $K_2Si_2O_5$.

Example X

The 200-hour corrosion test was performed on water that was inhibited with Inhibitor G. The test was run at 85° C. for 168 hours while the water was aerated at a rate of 200 milliliters of air per minute. The water contained 100 parts per million of $HCO_3^-$-$SO_4^=$ and $Cl^-$ ions to increase its corrosive nature but was free of water soluble organic liquids such as alcohols. The results that were obtained appear in Table XII.

TABLE XII

| Inhibitor | Amount [1] | pH | | Wt. Losses (mg./9 sq. in.) | | |
|---|---|---|---|---|---|---|
| | | I | F | Fe | Al | Br |
| None | | 8.4 | 9.7 | 892 | 126 | 17 |
| | | 8.4 | 9.7 | 799 | 129 | 18 |
| Inhibitor G | 0.1 | 9.8 | 9.9 | 12 | 5 | 19 |
| | | 9.8 | 9.7 | 29 | 15 | 15 |
| Do | 1.0 | 10.8 | 10.5 | 1 | 1 | 8 |
| | | 10.8 | 10.7 | 0 | 0 | 5 |
| Do | 2.0 | 11.0 | 10.4 | 0 | 0 | 8 |
| | | 11.0 | 10.7 | 1 | 1 | 10 |

[1] Parts by weight per 100 parts by weight of the water.

These results demonstrate that the organosilicon inhibitors employed in the process of this invention inhibit the corrosion of metals that are in contact with alcohol-free water containing inorganic ions.

Example XI

The 200-hour corrosion test was run on inhibited alcohol compositions of this invention containing Inhibitors N to Z inclusive. The groups present in these various inhibitors and the relative amounts of the groups are shown in Table XIII. The test liquids contained 100 parts by weight of ethylene glycol and 180 parts by weight of water. The results of the 200-hour corrosion test are shown in Table XIV.

TABLE XIII

| Inhibitor | Siloxane Groups | | Groups Having the Formula $(KO)_d SiO_{4-d/2}$ | |
|---|---|---|---|---|
| | Formula | Parts [a] | Value of d | Parts [a] |
| N | $NH_2(CH_2)_3 SiO_{1.5}$ and $KOOCCH_2CH_2 SiO_{1.5}$ | 11.5 17.0 | 1 | 71.5 |
| O | $KOOCCH_2CH_2 SiO_{1.5}$ and $CH_2=CHSiO_{1.5}$ | 17.6 8.6 | 1 | 73.8 |
| P | $KOOCCH_2CH_2 SiO_{1.5}$ and $CH_3 SiO_{1.5}$ | 17.9 7.2 | 1 | 74.9 |
| Q | $NH_2(CH_2)_3 SiO_{1.5}$ and $C_2H_5 OOC^b(CH_2)_3 SiO_{1.5}$ | 11.5 17.4 | 1 | 71.1 |
| R | $NH_2(CH_2)_3 SiO_{1.5}$ and $C_2H_5 OOC^b(CH_2)_2 SiO_{1.5}$ | 11.3 18.6 | 1 | 70.1 |
| S | $KOOCCH_2CH_2 SiO_{1.5}$ | 36.5 | 2 | 63.5 |
| T | $KOOCCH_2CH_2 SiO_{1.5}$ | 28.6 | 1 | 71.4 |
| U | $KOOCCH_2CH_2 SiO_{1.5}$ | 26.4 | 0.8 | 73.6 |
| V | $KOOCCH_2CH_2 SiO_{1.5}$ | 24.1 | 0.67 | 75.9 |
| W | $KOOCCH_2CH_2 SiO_{1.5}$ | 28.6 | 1 | 71.4 |
| X | $KOOCCH(CH_3)CH_2 Si(CH_3)O$ | 31.1 | 1 | 68.9 |
| Y | $KOOC(CH_2)_3 Si(CH_3)O$ | 31.1 | 1 | 68.9 |
| Z | $KOOCCH_2CH_2 SiO_{1.5}$ | 30.2 | 1 | 69.8 |

[a] Parts by weight per 100 parts by weight of the inhibitor.
[b] Some of these $C_2H_5 OOC$ groups were converted to $KOOC$-groups by reaction with the potassium ions in the test liquid.

TABLE XIV

| Inhibitor | Parts [1] | pH | | RA | | Wt. Losses, mg./9 in.² | | | | |
|---|---|---|---|---|---|---|---|---|---|---|
| | | I | F | I | F | Fe | Al | Br | Cu | S.S. |
| N | 2.17 | 11.3 11.3 | 11.1 11.1 | 57 57 | 50 50 | 1 2 | 0 0 | 3 7 | 4 11 | 5.5 5.5 |
| O | 2.10 | 11.1 11.1 | 10.9 10.9 | 57 57 | 51 50 | 2 1 | 0 0 | 7 5 | 11 7 | 5.5 5.5 |
| P | 2.07 | 11.1 11.1 | 11.0 10.9 | 57 57 | 49 51 | 4 2 | 0 0 | 7 13 | 23 56 | 5.5 5.5 |
| Q | 2.18 | 10.8 10.8 | 11.3 11.4 | 64 ----- | 58 57 | 3 3 | 1 2 | 6 5 | 5 6 | 6 5.5 |
| R | 2.21 | 11.1 | 11.4 11.3 | 63 ----- | 62 57 | 2 4 | 2 1 | 5 5 | 4 6 | 5 5.5 |
| S | 1.70 | 11.6 | 11.1 | 55 | 50 | 4 | 1 | 5 | 32 | 5 |
| T | 2.17 | 11.2 11.2 | 11.2 11.2 | 58 58 | 57 57 | 3 3 | 0 0 | 6 4 | 7 9 | 5.5 5.5 |
| U | 2.35 | 11.1 11.1 | 11.1 11.1 | 56 56 | 52 51 | 3 6 | 0 1 | 6 4 | 7 9 | 5.5 5.5 |
| V | 2.57 | 11.1 11.1 | 11.0 11.1 | 55 55 | 53 50 | 5 3 | 1 0 | 5 7 | 16 17 | 5 5 |
| W | 2.17 | 11.1 | 10.9 11.0 | 59 ----- | 53 56 | 2 3 | 1 0 | 3 8 | 8 10 | 5 5.5 |
| X | 2.25 | 11.3 | 11.1 11.1 | 57 ----- | 60 58 | 2 2 | 0 0 | 5 4 | 7 12 | 5 5 |
| Y | 2.25 | 11.3 | 11.1 11.0 | 56 ----- | 55 54 | 5 5 | 0 0 | 5 4 | 8 5 | 5.5 5 |
| Z | 2.22 | 11.2 | 11.1 11.0 | 57 ----- | 54 54 | 4 2 | 0 0 | 3 3 | 4 6 | 5.5 5 |

[1] By weight per 100 parts by weight of the ethylene glycol in the test liquid.
The results, when compared to the results shown in Table IV, demonstrate the improved corrosion protection obtained with the inhibited alcohol compositions of this invention.

The phrases "monovalent hydrocarbon group" and "divalent hydrocarbon group" are employed herein in the generic sense to denote both unsubstituted and substituted groups.

From the foregoing examples it is seen that organosilicon polymers containing from 10 to 90 parts by weight of groups represented by Formula 1 and from 10 to 90 parts by weight of groups represented by Formula 2 and organosilicon polymers containing from 10 to 80 parts by weight of groups represented by Formula 1, from 10 to 80 parts by weight of groups represented by Formula 2 and from 10 to 80 parts by weight of groups represented by Formula 3 [these parts by weight being based on 100 parts by weight of the polymers] are particularly effective corosion inhibitors.

What is claimed is:

1. An improved inhibited alcohol composition comprising an alcohol and, as an inhibitor, a corrosion inhibiting amount of an organosilicon polymer consisting essentially of: (A) from 0.1 to 99.9 parts by weight of siloxane groups represented by the formula:

wherein M is a cation that forms a water soluble silicate, $a$ is the valence of the cation represented by M and has a value of at least one, R is a member selected from the group consisting of the unsubstituted divalent hydrocarbon groups and $M_{1/a}OOC$ substituted divalent hydrocarbon groups, each $M_{1/a}OOC$ group is connected to the silicon atom through at least 2 carbon atoms of the group represented by R, $R^1$ is a monovalent hydrocarbon group, $b$ has a value from 1 to 3 inclusive, $c$ has a value from 0 to 2 inclusive and $(b+c)$ has a value from 1 to 3 inclusive and (B) from 0.1 to 99.9 parts by weight of groups represetned by the formula:

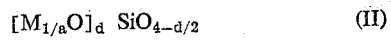

wherein M and $a$ have the above-defined meanings and $d$ has a value from 1 to 3 inclusive, said parts by weight of said groups being based on 100 parts by weight of the organosilicon polymer.

2. The composition of claim 1 wherein the organosilicon polymer contains (A) from 10 to 90 parts by weight of groups represented by Formula I and B from 10 to 90 parts by weight of groups represented by Formula II.

3. The compositions of claim 1 wherein the organosilicon polymer contains (A) from 12.5 to 50 parts by weight of groups represented by Formulas I and B from 50 to 87.5 parts by weight of groups represented by Formula II.

4. The compositions of claim 1 wherein the alcohol is a glycol.

5. The compositions of claim 1 wherein the alcohol is ethylene glycol.

6. The compositions of claim 1 wherein M is potassium.

7. The composition of claim 1 wherein M is sodium.

8. The composition of claim 1 which contains, as an additional component, from 0.1 part to 10 parts by weight of water per 100 parts by weight of the alcohol.

9. The composition of claim 1 which contains, as an additional component, from 30 to 900 parts by weight of water per 100 parts by weight of the alcohol.

10. An improved inhibited alcohol composition comprising a glycol, as an inhibitor, a corrosion inhibiting amount of an organosilicon polymer consisting essentially of: (A) from 0.1 to 99.9 parts by weight of siloxane groups represented by the formula:

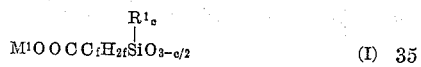

wherein M' is a member selected from the group consisiting of sodium and potassium, $f$ has a value of at least 2, $R^1$ is a monovalent hydrocarbon group, $c$ has a value from 0 to 2 inclusive and the M¹OOC group is connected to the silicon atom through at least 2 carbon atoms of the group represented by $C_fH_{2f}$, and (B) from 0.1 to 99.9 parts by weight of groups represented by the formula:

$$(M^1O)_dSiO_{4-d/2} \quad (II)$$

wherein $M^1$ has the above-defined meaning and $d$ has a value from 1 to 3 inclusive, said parts by weight of said groups being based on 100 parts by weight of the organosilicon polymer.

11. The composition of claim 10 wherein the organosilicon polymer contains (A) from 10 to 90 parts by weight of groups represented by Formula I and (B) from 10 to 90 parts by weight of groups represented by Formula II.

12. The composition of claim 10 wherein the organosilicon polymer contains (A) from 12.5 to 50 parts by weight of groups represented by Formula I and (B) from 50 to 87.5 parts by weight of groups represented by Formula II.

13. The composition of claim 10 wherein the alcohol is ethylene glycol.

14. The composition of claim 10 wherein $M^1$ is potassium.

15. The composition of claim 10 wherein $M^1$ is sodium.

16. The composition of claim 10 which contains, as an additional component, from 0.1 part to 10 parts by weight of water per 100 parts by weight of the alcohol.

17. The composition of claim 10 which contains, as an additional component, from 30 to 900 parts by weight of water per 100 parts by weight of the alcohol.

18. The composition of claim 10 wherein $f$ has a value from 2 to 5 inclusive.

19. A single phase inhibited ethylene glycol composition comprising ethylene glycol, from 0 to 900 parts by weight of water per 100 parts by weight of the ethylene glycol and, as an inhibitor, from 0.1 part to 10 parts by weight per 100 parts by weight of the ethylene glycol of an organosilicon polymer consisting essentially of : (A) from 12.5 to 50 parts by weight per 100 parts by weight of the polymer of siloxane groups represented by the formula:

$$KOOCCH_2CH_2SiO_{1.5}$$

and (B) from 50 to 87.5 parts by weight per 100 parts by weight of the polymer of groups represented by the formula $$(KO)_dSiO_{4-d/2}$$

wherein $d$ has a value from 1 to 3 inclusive.

20. A single phase inhibited ethylene glycol composition comprising ethylene glycol, from 0 to 900 parts by weight of water per 100 parts by weight of the ethylene glycol and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$KOOCCH_2CH_2Si(CH_3)O$$

and (B) from 50 to 87.5 parts by weight per 100 parts by weight of the polymer of groups represented by the formula $$(KO)_dSiO_{4-d/2}$$

wherein $d$ has a value from 1 to 3 inclusive.

21. A single phase inhibited ethylene glycol composition comprising ethylene glycol, from 0 to 900 parts by weight of water per 100 parts by weight of the ethylene glycol and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$KOOC(CH_2)_3SiO_{1.5}$$

and (B) from 50 to 87.5 parts by weight per 100 parts by weight of the polymer of groups represented by the formula $$(KO)_dSiO_{4-d/2}$$

wherein $d$ has a value from 1 to 3 inclusive.

22. A single phase inhibited ethylene glycol composition comprising ethylene glycol, from 0 to 900 parts by weight of water per 100 parts by weight of the ethylene glycol and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$KOOCCH(CH_3)CH_2Si(CH_3)O$$

and (B) from 50 to 87.5 parts by weight per 100 parts by weight of the polymer of groups represented by the formula $$(KO)_dSiO_{4-d/2}$$

wherein $d$ has a value from 1 to 3 inclusive.

23. A single phase inhibited ethylene glycol composition comprising ethylene glycol, from 0 to 900 parts by weight of water per 100 parts by weight of the ethylene glycol and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$\underset{\underset{COOK}{|}}{KOOCCH_2CHCH_2SiO_{1.5}}$$

and (B) from 50 to 87.5 parts by weight per 100 parts by weight of the polymer of groups represented by the formula $$(KO)_d SiO_{4-d/2}$$

wherein $d$ has a value from 1 to 3 inclusive.

24. An improved inhibited alcohol composition comprising an alcohol and, as an inhibitor, a corrosion inhibiting amount of an organosilicon polymer consisting essentially of: (A) from 0.1 to 99.8 parts by weight of siloxane groups represented by the formula:

$$[M_{1/a}OOCR]_b \overset{R_c^1}{\underset{|}{Si}}O_{4-(b+c)/2} \quad (I)$$

wherein M is a cation that forms a water soluble silicate, $a$ is the valence of the cation represented by M, and has a value of at least one, R is a member selected from the group consisting essentially of the unsubstituted divalent hydrocarbon groups and $M_{1/a}OOC$ substituted divalent hydrocarbon groups, each $M_{1/a}OOC$ group is connected to the silicon atom through at least 2 carbon atoms of the group represented by R, $R^1$ is a monovalent hydrocarbon group, $b$ has a value from 1 to 3 inclusive, $c$ has a value from 0 to 2 inclusive and $(b+c)$ has a value from 1 to 3 inclusive; (B) from 0.1 to 99.8 parts by weight of groups represented by the formula:

$$[M_{1/a}O]_d SiO_{4-d/2} \quad (II)$$

wherein M and $a$ have the above-defined meanings and $d$ has a value from 1 to 3 inclusive and (C) from 0.1 to 99.8 parts by weight of siloxane groups represented by the formula:

$$[R''_e SiO_{4-e/2}] \quad (III)$$

wherein $R''$ is a monovalent hydrocarbon group containing from 0 to 1 amino groups as substituents and $e$ has a value from 0 to 3 inclusive, said parts by weight of said groups being based on 100 parts by weight of the organosilicon polymer.

25. The composition of claim 24 wherein the organosilicon polymer contains (A) from 10 to 80 parts by weight of groups represented by Formula I, (B) from 10 to 80 parts by weight of groups represented by Formula II and from 10 to 80 parts by weight of groups represented by Formula III.

26. The composition of claim 24 wherein the organosilicon polymer contains (A) from 12.5 to 50 parts by weight of groups represented by Formula I, (B) from 37.5 to 75 parts by weight of groups represented by Formula II and from 12.5 to 50 parts by weight of groups represented by Formula III.

27. The composition of claim 24 wherein the alcohol is a glycol.

28. The composition of claim 24 wherein the alcohol is ethylene glycol.

29. The composition of claim 24 wherein M is potassium.

30. The composition of claim 24 wherein M is sodium.

31. The composition of claim 24 wherein at least one group represented by $R''$ is an amino-substituted monovalent hydrocarbon group.

32. The composition of claim 24 wherein at least one group represented by $R''$ is an aminoalkyl group.

33. The composition of claim 24 wherein at least one group represented by $R''$ is an aminoalkylaminoalkyl group.

34. The composition of claim 24 which contains, as an additional component, from 0.1 to 10 parts by weight of water per 100 parts by weight of the alcohol.

35. The composition of claim 24 which contains, as an additional component, from 30 to 900 parts by weight of water per 100 parts by weight of the alcohol.

36. An improved inhibited alcohol composition comprising a glycol and, as an inhibitor, a corrosion inhibiting amount of an organosilicon polymer consisting essentially of (A) from 0.1 to 99.8 parts by weight of silioxane groups represented by the formula:

$$M^1 OOC_f H_{2f} \overset{R_c^1}{\underset{|}{Si}}O_{3-c/2} \quad (I)$$

wherein $M'$ is a member selected from the group consisting of sodium and potassium, $f$ has a value of at least 2, $R^1$ is a monovalent hydrocarbon group, $c$ has a value from 0 to 2 inclusive and the $M^1OOC$ group is connected to the silicon atom through at least 2 carbon atoms of the group represented by $C_f H_{2f}$, (B) from 0.1 to 99.8 parts by weight of groups represented by the formula:

$$(M'O)_d SiO_{4-d/2} \quad (II)$$

wherein $M'$ has the above-defined meaning and $d$ has a value from 1 to 3 inclusive and (C) from 0.1 to 99.8 parts by weight of siloxane groups represented by the formula:

$$[R''_e SiO_{4-e/2}] \quad (III)$$

wherein $R''$ is a monovalent hydrocarbon group containing from 0 to 1 amino groups as substituents and $e$ has a value from 0 to 3 inclusive, said parts by weight of said groups being based on 100 parts by weight of the organosilicon polymer.

37. The composition of claim 36 wherein the organosilicon polymer contains (A) from 12.5 to 50 parts by weight of groups represented by Formula I, (B) from 37.5 to 75 parts by weight of groups represented by Formula II and from 12.5 to 50 parts by weight of groups represented by Formula III.

38. The composition of claim 36 wherein the alcohol is a glycol.

39. The composition of claim 36 wherein the alcohol is ethylene glycol.

40. The composition of claim 36 wherein M is potassium.

41. The composition of claim 36 wherein M is sodium.

42. The composition of claim 36 wherein at least one group represented by $R''$ is an amino-substituted monovalent hydrocarbon group.

43. The composition of claim 36 wherein at least one group represented by $R''$ is an aminoalkyl group.

44. The composition of claim 36 wherein at least one group represented by $R''$ is an aminoalkylaminoalkyl group.

45. The composition of claim 36 which contains, as an additional component, from 0.1 to 10 parts by weight of water per 100 parts by weight of the alcohol.

46. The composition of claim 36 which contains, as an additional component, from 30 to 900 parts by weight of water per 100 parts by weight of the alcohol.

47. The composition of claim 36 wherein at least one group represented by $R''$ is a gamma-aminopropyl group.

48. The composition of claim 36 wherein at least one group represented by $R''$ is a vinyl group.

49. The composition of claim 36 wherein at least one group represented by $R''$ is a methyl group.

50. A single phase inhibited ethylene glycol composition comprising ethylene glycol, from 0 to 900 parts by weight of water per 100 parts by weight of the ethylene glycol, and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$KOOCCH_2CH_2SiO_{1.5}$$

(B) from 37.5 to 75 parts by weight per 100 parts by weight of the polymer of groups represented by the formula:

$$(KO)_b SiO_{4-b/2}$$

wherein $b$ has a value from 1 to 3 inclusive and (C) from 12.5 to 50 parts by weight per 100 parts by weight of the polymer of groups represented by the formula:

$$CH_2=CHSiO_{1.5}$$

51. A single phase inhibited ethylene glycol composition comprising ethylene glycol, from 0 to 900 parts by weight of water per 100 parts by weight of the ethylene glycol, and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$KOOCCH_2CH_2SiO_{1.5}$$

(B) from 37.5 to 75 parts by weight per 100 parts by weight of the polymer of groups represented by the formula:

$$(KO)_bSiO_{4-b/2}$$

wherein $d$ has a value from 1 to 3 inclusive and (c) from 12.5 to 50 parts by weight per 100 parts by weight of the polymer of groups represented by the formula:

$$CH_3SiO_{1.5}$$

52. A single phase inhibited ethylene glycol composition comprising ethylene glycol, from 0 to 900 parts by weight of water per 100 parts by weight of the ethylene glycol, and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$KOOCCH_2CH_2SiO_{1.5}$$

(B) from 37.5 to 75 parts by weight per 100 parts by weight of the polymer of groups represented by the formula:

$$(KO)_bSiO_{4-b/2}$$

wherein $b$ has a value from 1 to 3 inclusive and (C) from 12.5 to 50 parts by weight per 100 parts by weight of the polymer of groups represented by the formula:

$$NH_2(CH_2)_3SiO_{1.5}$$

53. A single phase inhibited ethylene glycol composition comprising ethylene glycol, from 0 to 900 parts by weight of water per 100 parts by weight of the ethylene glycol, and, as an inhibitor, from 0.1 part to 10 parts by weight per 100 parts by weight of the ethylene glycol of an organosilicon polymer consisting essentially of: (A) from 12.5 to 50 parts by weight per 100 parts by weight of the polymer of siloxane groups represented by the formula:

$$KOOC(CH_2)_3SiO_{1.5}$$

(B) from 37.5 to 75 parts by weight per 100 parts by weight of the polymer of groups represented by the formula:

$$(KO)_bSiO_{4-b/2}$$

wherein $b$ has a value from 1 to 3 inclusive and (C) from 12.5 to 50 parts by weight per 100 parts by weight of the polymer of groups represented by the formula:

$$NH_2(CH_2)_3SiO_{1.5}$$

54. An anhydrous mixture comprising (A) an alcohol, (B) a water soluble silicate and (C) a silane represented by the formula:

$$[Y'R'''']_b\overset{R_c'}{\underset{|}{Si}}X_{4-(b+c)}$$

wherein Y' is a member selected from the group consisting of the cyano and the R'OOC— groups, R'''' is a member selected from the group consisting of unsubstituted divalent hydrocarbon groups and Y' substituted divalent hydrocarbon groups, each group represented by Y' is separated from the silicon atom by at least two carbon atoms of the group represented by R'''', R' is a monovalent hydrocarbon group, X is a hydrocarbonoxy group, $b$ has a value from 1 to 3 inclusive, $c$ has a value from 0 to 2 inclusive and $(b+c)$ has a value from 1 to 3 inclusive, said water soluble silicate and said silane being present in the mixture in such relative amounts as are required to form, by reaction of the mixture with water, the organosilicon polymer present in the composition claimed in claim 1.

55. An anhydrous mixture comprising (A) an alcohol, (B) a water soluble silicate, (C) a silane represented by the formula:

$$[Y'R'''']_b\overset{R_c'}{\underset{|}{Si}}X_{4-(b+c)}$$

wherein Y' is a member selected from the group consisting of the cyano and the R'OOC— groups, R'''' is a member selected from the group consisting of unsubstituted divalent hydrocarbon groups and Y' substituted divalent hydrocarbon groups, each group represented by Y' is separated from the silicon atom by at least two carbon atoms of the group represented by R'''', R' is a monovalent hydrocarbon group, X is a hydrocarbonoxy group, $b$ has a value from 1 to 3 inclusive, $c$ has a value from 0 to 2 inclusive and $(b+c)$ has a value from 1 to 3 inclusive and (D) a silane represented by the formula:

$$R_e''SiX_{4-e}$$

wherein R'' is a monovalent hydrocarbon group containing from 0 to 1 amino groups as substituents, $e$ has a value from 0 to 3 inclusive and X has the above-defined meaning, said water soluble silicate and said silane being present in the mixture in such relative amounts as are required to form, by reaction of the mixture with water, the organosilicon polymer present in the composition claimed in claim 1.

56. A process for inhibiting the corrosion of metals below sodium in the electromotive series that come in contact with aqueous liquids, said process comprising adding to the liquid a corrosion inhibiting amount of a member selected from the group consisting of:

(I) an organosilicon polymer consisting essentially of:
(A) from 0.1 to 99.9 parts by weight of siloxane groups represented by the formula:

$$[M_{1/a}OOCR]_b\overset{R_c^1}{\underset{|}{Si}}O_{4-(b+c)/2}$$

wherein M is a cation that forms a water soluble silicate, $a$ is the valence of the cation represented by M and has a value of at least one, R is a member selected from the group consisting of the unsubstituted hydrocarbon groups and $M_{1/a}OOC$ substituted divalent hydrocarbon groups, each $M_{1/a}OOC$ group is connected to the silicon atom through at least 2 carbon atoms of the group represented by R, $R^1$ is a monovalent hydrocarbon group, $b$ has a value from 1 to 3 inclusive, $c$ has a value from 0 to 2 inclusive and $(b+c)$ has a value from 1 to 3 inclusive and (B) from 0.1 to 99.9 parts by weight of groups represented by the formula:

$$[M_{1/a}O]_dSiO_{4-d/2}$$

wherein M and $a$ have the above-defined meanings and $d$ has a value from 1 to 3 inclusive, said parts by weight of said groups being based on 100 parts by weight of the organosilicon polymer, and (II) a mixture capable of reacting with water to produce the organosilicon polymer, said mixture consisting essentially of (A) a water soluble silicate and (B) a silane represented by the formula:

$$[Y'R'''']_b\overset{R'_c}{\underset{|}{Si}}X_{4-(b+c)}$$

wherein Y' is a member selected from the group consisting of the cyano and the R'OOC— groups, R'''' is a divalent hydrocarbon group containing from 0 to 1 groups represented by Y' as substituents, each group represented by Y' is separated from the silicon atom by at least two carbon atoms of the group represented by R'''', R' is a monovalent hydrocarbon group, X is a hydrocarbonoxy group, b has a value from 1 to 3 inclusive, c has a value from 0 to 2 inclusive and (b+c) has a value from 1 to 3 inclusive, said water soluble silicate and said silane being present in the mixture in such relative amounts as are required to form, by reaction of the mixture with water, the organosilicon polymer present in the composition claimed in claim 1.

57. A process for inhibiting the corrosion of metals below sodium in the electromotive series that come in contact with aqueous liquids, said process comprising adding to the liquid a corrosion inhibiting amount of a member selected from the group consisting of:
(I) an organosilicon polymer consisting essentially of:
(A) from 0.1 to 99.8 parts by weight of siloxane groups represented by the formula:

$$[M_{1/a}OOCR]_b\overset{R^1_c}{\underset{|}{Si}}O_{4-(b+c)/2}$$

wherein M is a cation that forms a water soluble silicate, a is the valence of the cation represented by M, and has a value of at least one, R is a member selected from the group consisting of the unsubstituted divalent hydrocarbon groups and $M_{1/a}OOC$ substituted divalent hydrocarbon groups, each $M_{1/a}OOC$ group is connected to the silicon atom through at least 2 carbon atoms of the group represented by R, $R^1$ is a monovalent hydrocarbon group, b has a value from 1 to 3 inclusive, c has a value from 0 to 2 inclusive and (b+c) has a value from 1 to 3 inclusive; (B) from 0.1 to 99.8 parts by weight of groups represented by the formula:

$$[M_{1/a}O]_dSiO_{4-d/2}$$

wherein M and a have the above-defined meanings and d has a value from 1 to 3 inclusive and (C) from 0.1 to 99.8 parts by weight of siloxane groups represented by the formula:

$$[R''_eSiO_{4-e/2}]$$

wherein R'' is a monovalent hydrocarbon group containing from 0 to 1 amino groups as substituents and e has a value from 0 to 3 inclusive, said parts by weight of said groups being based on 100 parts by weight of the organosilicon polymer and (II) a mixture capable of reacting with water to produce the organosilicon polymer, said mixture consisting essentially of (A) a water soluble silicate (B) a silane represented by the formula:

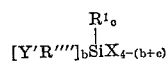
$$[Y'R'''']_b\overset{R^1_c}{\underset{|}{Si}}X_{4-(b+c)}$$

wherein Y' is a member selected from the group consisting of the cyano and the R'OOC— groups, R'''' is a member selected from the group consisting of unsubstituted divalent hydrocarbon groups and Y' substituted divalent hydrocarbon groups, each group represented by Y' is separated from the silicon atom by at least two carbon atoms of the group represented by R'''', $R^1$ is a monovalent hydrocarbon group, X is a hydrocarbonoxy group, b has a value from 1 to 3 inclusive, c has a value from 0 to 2 inclusive and (b+c) has a value from 1 to 3 inclusive and (C) a silane represented by the formula:

$$[R''_eSiX_{4-e}]$$

wherein R'' is a monovalent hydrocarbon group containing from 0 to 1 amino groups as substituents, E has a value from 0 to 3 inclusive and X has the above-defined meaning, said water soluble silicate (A) and said silanes (B) and (C) being present in the mixture in such relative amounts as are required to form the organosilicon polymer present in the composition claimed in claim 24.

58. A process for inhibiting the corrosion of metals below sodium in the electromotive series that come in contact with aqueous liquids, said process comprising adding to the liquid from 0.01 part to 10 parts by weight per 100 parts by weight of the liquid of an organosilicon polymer consisting essentially of: (A) from 0.1 to 99.9 parts by weight of siloxane groups represented by the formula:

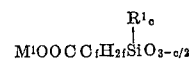
$$M'OOCC_fH_{2f}\overset{R^1_c}{\underset{|}{Si}}O_{3-c/2}$$

wherein M' is a member selected from the group consisting of sodium and potassium, f has a value of at least 2, $R^1$ is a monovalent hydrocarbon group, c has a value from 0 to 2 inclusive and the M'OOC group is connected to the silicon atom through at least 2 carbon atoms of the group represented by $C_fH_{2f}$, and (B) from 0.1 to 99.9 parts by weight of groups represented by the formula:

$$(M'O)_dSiO_{4-d/2}$$

wherein M' has the above-defined meaning and d has a value from 1 to 3 inclusive, said parts by weight of said groups being based on 100 parts by weight of the organosilicon polymer.

59. The process of claim 58 wherein the aqueous liquid is an aqueous alcohol solution.

60. The process of claim 58 wherein the aqueous liquid is an aqueous ethylene glycol solution.

61. The process of claim 58 wherein the metal contains iron.

62. The process of claim 58 wherein the metal contains aluminum.

63. The process of claim 58 wherein M' is potassium.

64. The process of claim 58 wherein M' is sodium.

65. A process for inhibiting the corrosion of metals below sodium in the electromotive series that come in contact with aqueous liquids, said process comprising adding to the liquid from 0.01 part to 10 parts by weight per 100 parts by weight of the aqueous liquid of an organosilicon polymer consisting essentially of: (A) from 0.1 to 99.8 parts by weight of siloxane groups represented by the formula:

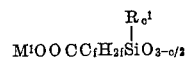
$$M'OOCC_fH_{2f}\overset{R^1_c}{\underset{|}{Si}}O_{3-c/2}$$

wherein M' is a member selected from the group consisting of sodium and potassium, f has a value of at least 2, $R^1$ is a monovalent hydrocarbon group, c has a value from 0 to 2 inclusive and the M'OOC group is connected to the silicon atom through at least 2 carbon atoms of the group represented by $C_fH_{2f}$, (B) from 0.1 to 99.8 parts by weight of groups represented by the formula:

$$(M'O)_dSiO_{4-d/2}$$

wherein M' has the above-defined meaning and d has a value from 1 to 3 inclusive and (C) from 0.1 to 99.8 parts by weight of siloxane groups represented by the formula:

$$[R_e''SiO_{4-e/2}]$$

wherein R'' is a monovalent hydrocarbon group containing from 0 to 1 amino groups as substituents and e has a value from 0 to 3 inclusive, said parts by weight of said groups being based on 100 parts by weight of the organosilicon polymer.

66. The process of claim 65 wherein the aqueous liquid is an aqueous alcohol solution.

67. The process of claim 65 wherein the aqueous liquid is an aqueous ethylene glycol solution.

68. The process of claim 65 wherein the metal contains iron.

69. The process of claim 65 wherein the metal contains aluminum.

70. The process of claim 65 wherein M' is potassium.

71. The process of claim 65 wherein M' is sodium.

References Cited by the Examiner

UNITED STATES PATENTS 2,676,182  4/1954   Daudt et al. _____ 260—448.2
2,957,899  10/1960  Black et al. _____ 260—448.2

MURRAY TILLMAN, *Primary Examiner.*

J. C. BLEUTGE, *Assistant Examiner.*